(12) United States Patent
Ruan et al.

(10) Patent No.: US 8,794,402 B2
(45) Date of Patent: Aug. 5, 2014

(54) WEIGHT COMPENSATING SHOCK ISOLATOR ASSEMBLY

(75) Inventors: Shubin Ruan, Williamsville, NY (US); Jeffrey T. Kelly, Orchard Park, NY (US)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 295 days.

(21) Appl. No.: 12/911,246

(22) Filed: Oct. 25, 2010

(65) Prior Publication Data

US 2012/0098174 A1 Apr. 26, 2012

(51) Int. Cl.
 F16F 9/49 (2006.01)
 F16F 7/00 (2006.01)
 F16M 1/00 (2006.01)

(52) U.S. Cl.
 USPC .................. 188/280; 267/131; 267/140.2

(58) Field of Classification Search
 USPC .......... 188/280, 284, 286–288; 267/131, 136, 267/140.2
 See application file for complete search history.

(56) References Cited

U.S. PATENT DOCUMENTS

| | | | | |
|---|---|---|---|---|
| 2,735,670 A * | 2/1956 | Schultze | ...................... | 267/127 |
| 3,605,960 A * | 9/1971 | Singer | ............................ | 188/287 |
| 4,252,359 A * | 2/1981 | Cooper | ..................... | 294/81.53 |
| 4,310,149 A * | 1/1982 | Camilleri | ....................... | 267/136 |
| 4,351,515 A * | 9/1982 | Yoshida | ........................ | 267/225 |
| 4,596,321 A * | 6/1986 | Harper et al. | ............ | 188/322.15 |
| 4,662,597 A * | 5/1987 | Uecker et al. | ................. | 248/564 |
| 4,760,996 A * | 8/1988 | Davis | ............................ | 267/122 |
| 5,727,663 A * | 3/1998 | Taylor | ............................ | 188/378 |
| 5,769,190 A * | 6/1998 | Deferme | .................... | 188/282.1 |
| 6,065,573 A * | 5/2000 | Kelly | .......................... | 188/319.1 |
| 6,648,109 B2 * | 11/2003 | Farr et al. | ...................... | 188/287 |
| 7,299,907 B2 * | 11/2007 | Ferkany | ........................ | 188/286 |
| 8,205,729 B2 * | 6/2012 | Miyasato et al. | ............. | 188/286 |
| 2009/0001636 A1 * | 1/2009 | Miyasato et al. | .......... | 267/64.13 |

OTHER PUBLICATIONS

ArmorWorks Shock Ride Extreme Blast Protection; 1 page.
Last Armor Blast Mitigating Seat; www.LastArmor.com; 1 page.
Blast Mitigating Seat; Scott R. Gourley, SOTECH Correspondent; www.SOTECH-kmi.com; 7 pages.

* cited by examiner

*Primary Examiner* — Vishal Sahni
(74) *Attorney, Agent, or Firm* — Hiscock & Barclay, LLP

(57) ABSTRACT

A weight compensating shock isolator assembly includes at least one spring with preload to return the isolator to an initial position, the at least one spring exerting a spring force that changes during the isolator stroke. The isolator includes a hydraulic cylinder containing hydraulic fluid and a piston that moves relative to the hydraulic cylinder, wherein hydraulic fluid is forced through or around a piston head during relative movement thereof with respect to the hydraulic cylinder to create a resisting force that is stroke and velocity dependent, with the damping constant C changing with stroke.

11 Claims, 5 Drawing Sheets

WEIGHT COMPENSATING SHOCK ISOLATOR ASSEMBLY

FIELD OF THE INVENTION

This application generally relates to the field of shock isolation devices and more specifically to a shock isolating assembly for isolating high acceleration loads to seats in a vehicle that could be subjected to a blast from under the vehicle. The herein described shock isolator assembly is self-resetting and therefore reusable, and also does not require a separate adjustment for use over a significant weight range of seat occupants wherein the assembly also effectively isolates over a wide temperature range.

BACKGROUND OF THE INVENTION

Military vehicles, such as personnel carriers and the like, include blast seats to protect the occupant from a blast occurring under the vehicle such as, for example, those caused by a landmine or improvised explosive device. Such blasts produce acceleration pulses that would be severely injurious to the seat occupant, including not only the initial blast but also the "slam-down" acceleration pulse that the occupant would be subjected to when the vehicle returns to the ground following the blast itself. Many currently known blast seat designs use a link which deforms when subjected to a force from an acceleration pulse. These devices are somewhat effective, but only work a single time and may not work well over a wide weight range of seat occupants.

Other known systems, such as those described by U.S. Pat. Nos. 5,810,125 and 5,556,160, among others, utilize a dedicated set of sensors in conjunction with automated control mechanisms in order to dynamically adjust the force on the seat, for example, based upon weight considerations. These systems, however, are extremely complex in terms of their cost and manufacture.

SUMMARY OF THE INVENTION

Therefore and according to one aspect of the present invention, there is provided a weight compensating shock isolator assembly, said assembly comprising at least one spring with preload to return the isolator to an initial position, said at least one spring exerting a spring force that changes during the isolator stroke. The isolator includes a hydraulic cylinder containing hydraulic fluid and a piston that moves relative to the hydraulic cylinder, wherein the assembly further includes means for forcing hydraulic fluid through or around a piston head during relative movement with respect to the hydraulic cylinder to create a resisting force that is stroke and velocity dependent, with the damping constant C changing with stroke.

According to a preferred version, the spring preload and spring force of the defined assembly are each temperature independent. The isolator assembly can further include accumulator means for compensating for fluid expansion and contraction and for the net rod volume that enters into the hydraulic cylinder during compression. In one version a series of wave washers or disc springs are utilized. In another, material such as a closed cell foam, can be used.

In one version, at least one flow control element is used to control the rate of return of the isolator to its initial use position. According to at least one embodiment described herein, the means for forcing said hydraulic fluid through or around said piston head includes said at least one flow control element and a progressively stepped bore formed within said cylinder through which said piston is moved.

According to another aspect of the present invention, there is provided an isolator system for a vehicle blast seat, said system comprising an isolator adapted for vertical attachment to a frame portion of the blast seat, the isolator having a movable cylinder disposed with respect to a piston assembly within the cylinder and a structural sleeve supporting the cylinder. First and second biasing springs are axially disposed over the exterior of the cylinder, each of the springs having a different stiffness, the biasing springs being disposed axially in relation to one another to provide a spring preload and to provide an increasing stiffness after the assembly is compressed to a specific position. A damping mechanism is further provided for progressively damping the movement of the cylinder relative to the piston assembly in at least one axial direction thereof.

Preferably, the cylinder that is used according to this invention is a hydraulic cylinder having contained therein a quantity of hydraulic fluid. In one version, the interior of the hydraulic cylinder can include a stepped bore which promotes progressive damping as the piston head passes therethrough. A piston head and the stepped bore provide a continuously changing damping constant C, in which resisting force $F=CV^\alpha$, V being the piston velocity and a being the velocity exponent. With proper selection of the hydraulic fluid, the velocity exponent can range from 0.1 to 1.0 or 2.0. Alternatively and/or in addition, the damping mechanism of this assembly can further or additionally include a series of wave washers or disc springs behind a rear bearing to allow for thermal expansion or contraction of the fluid and for the fluid displaced by the piston rod volume that enters into the cylinder during compression. Other accumulator means, such as air or closed cell foam and the like, can be used for accumulating the fluid due to thermal expansion or contraction and the fluid displaced by the rod volume entering the cylinder.

According to one described embodiment, the first biasing spring is disposed between shoulders on the structural sleeve and the second biasing spring is adjacently disposed relative to the first biasing spring between a shoulder on the structural sleeve and a shoulder on the hydraulic cylinder.

The herein described system provides shock isolation to a seat occupant during an initial shock or acceleration pulse to the blast seat when the seat is quickly accelerated upward as the isolator compresses, and also with regard to controlling the acceleration of the occupant as the isolator extends while the vehicle is accelerating upward and then falling back towards the ground, and also with regard to the so-called "slam-down" acceleration pulse, which occurs when the vehicle violently impacts the ground.

One advantage of the present invention is that adjustments of the herein described shock isolator assembly are not required, wherein the herein described system can effectively isolate seat occupants over a very wide weight range.

Another advantage is that the herein described shock isolator assembly is reusable and thus can be cycled many times, thereby isolating the seat occupant from the initial acceleration pulse from the blast and the second acceleration pulse from the "slam-down", as well as multiple blast events.

Another advantage is that the shock isolator assembly controls the extension rate of the assembly to effectively isolate seat occupants during extension of the isolator such that the seat occupant does not become decoupled from the seat during extension of the isolator.

Yet still another advantage is that the herein described shock isolator assembly incorporates mechanical springs to provide the preload that is required to support the weight range. The mechanical springs provide a preload and spring rate that are not temperature sensitive so there is no variation in the spring load when used over a wide temperature range.

These and other technical features and advantages will be apparent from the following Detailed Description, which should be read in conjunction with the accompanying drawings.

DETAILED DESCRIPTION

The following description relates to a weight compensating shock isolator assembly for use with at least one vehicle blast seat. Throughout the course of discussion several terms are used herein in order to provide a frame of reference with regard to the accompanying drawings, such as "distal", "proximal", "inner", "outer", "internal", "external" and the like. It should be noted that these terms are not intended to be overly limiting with regard to the herein described invention, including the claims, except where so specifically indicated.

Figure 1:
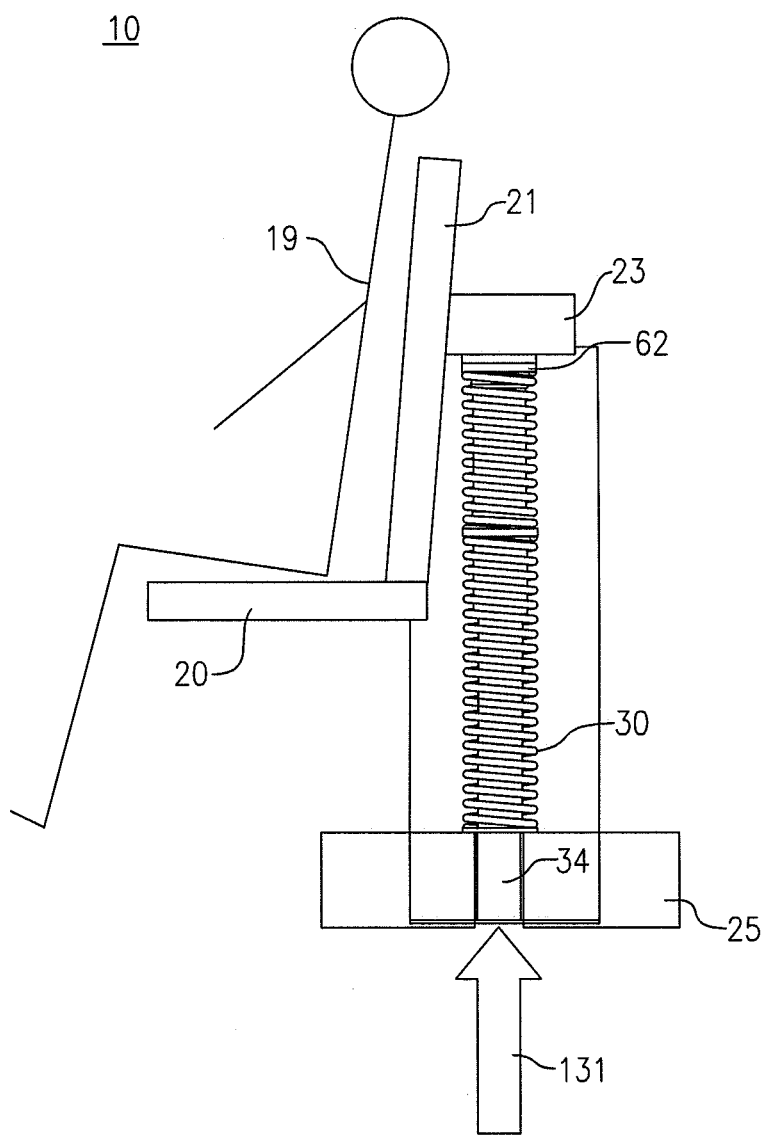
FIG. 1 is a representation of a shock isolator assembly made in accordance with a preferred embodiment, diagrammatically shown in a use environment with a vehicle blast seat.

Referring to FIG. 1 there is schematically shown a shock isolator assembly 30, which is mounted to the rear of a vehicle blast seat 20. According to this embodiment, the shock isolator assembly 30 is vertically mounted in an orientation that is substantially parallel to the back rest 21 of the blast seat 20, wherein the blast seat is guided by means (not shown), such that the herein described isolator assembly receives only vertical loads relative to the occupant 19 of the seat. The shock isolator assembly 30 is fixedly mounted by known means at one end thereof to the floor 25 of the vehicle 10 and to the rear of the vehicle seat 20 at its remaining end, by means of mounting hardware 23, as shown diagrammatically according to FIG. 1.

Figure 2:
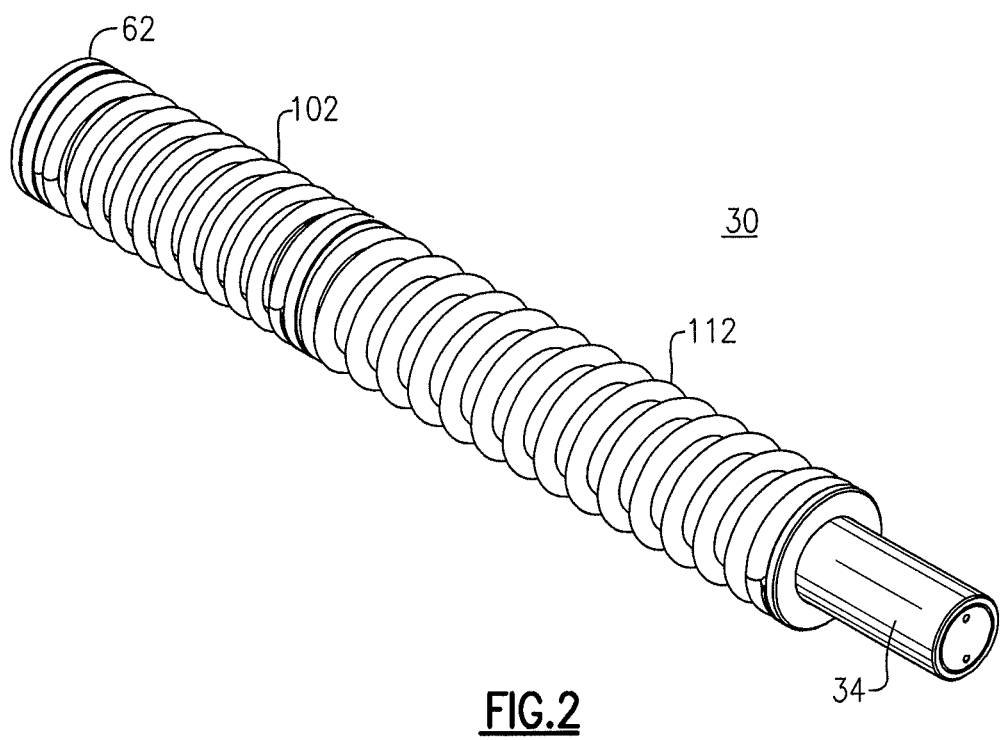
FIG. 2 is a perspective view of the shock isolator assembly of FIG. 1.
Figure 3:
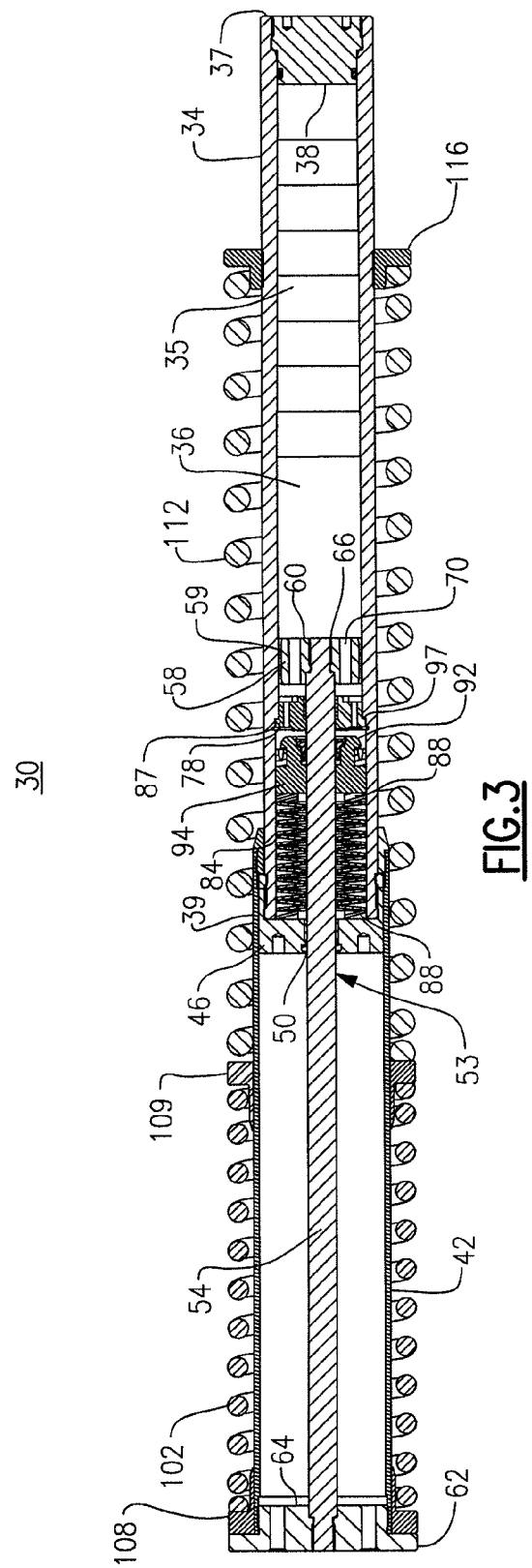
FIG. 3 is a sectioned elevational view of the shock isolator assembly of FIGS. 1 and 2, shown in a fully extended or initial use position.

Referring more specifically to FIGS. 2 and 3, the shock isolator assembly 30 is defined by a hydraulic cylinder 34 that is slidably movable within the confines of an open-ended structural sleeve 42. The hydraulic cylinder 34 is essentially hollow and retains a cylinder cap 38 that is fixedly attached at its proximal end 37 and a front bearing 46 at an opposing distal end 39, the latter of which includes a center opening 50 that receives a piston rod 54. The piston rod 54 is part of a piston assembly 53, the rod being attached to a piston head 58 at one end 60 and to a sleeve end member 62 at the opposite end 64 thereof. The piston rod 54 is fixedly secured at one end to the piston head 58 through a center opening 66 provided in the piston head 58, the piston head further including a plurality of flow control elements 70 which are circumferentially disposed about the center opening 66, permitting the passage therethrough of hydraulic fluid 36 contained within the hydraulic cylinder 34. The remaining end of the piston rod 54 is fixedly secured within the attached sleeve end member 62, the latter of which creates the closed end of the structural sleeve 42, wherein the sleeve end member is fixedly attached to the mounting means 23, FIG. 1, of the vehicle blast seat 20, FIG. 1. More specifically and referring to FIG. 1, an extending portion of the hydraulic cylinder 34 is mounted to the floor 25 of the vehicle 10 while the sleeve end member 62 is attached to the mounting means 23.

A quantity of hydraulic fluid 36 is disposed within the hollow confines of the hydraulic cylinder 34 through which the piston assembly 53 is caused to relatively move in an axial direction, as described in greater detail below, wherein the interior is further defined by a progressively stepped bore 35. The hydraulic fluid 36 is retained therein between the cylinder cap 38 and a separator assembly 92. During movement of the hydraulic cylinder 34 relative to the piston assembly 53, the hydraulic fluid 36 is forced through the flow control elements 70 in the piston head 58, and around the outside of the piston head 58 through an annular gap 59, which is created between the outside diameter of the piston head and the stepped bore 35 in the hydraulic cylinder 34. The change in the annular gap 59 thereby creates a progressively changing (dynamic) damping force based on piston head movement through the fluid 36 in the hydraulic cylinder 34. The flow control elements 70 further help establish the return rate of the isolator such that it extends quickly enough for the slam-down pulse, but not so quickly that the seat occupant 19, FIG. 1, will decouple from the seat at full extension.

Within the distal end 39 of the hydraulic cylinder 34 between the front bearing 46 and a corresponding rear bearing 78, which is intermediately disposed within the interior of the cylinder, is a series of stacked disc springs 84 or wave washers that are arranged in a linear fashion along the axis of the cylinder at the distal end thereof, adjacent to the front bearing 46. The stacked arrangement of the washers or disc springs 84 includes aligned individual center openings that are sized to permit the piston rod 54 to axially translate therethrough. One end of the stacked arrangement of disc springs 84 is disposed adjacent to an interior surface of the front bearing 46, with the exception of a flat washer 88 disposed therebetween in accordance with this specific embodiment. Another flat washer 88 is disposed between the remaining or opposite end of the set of disc springs 84 and a distal interior flanged surface of a separator assembly 92, the latter of which also includes a center opening that is appropriately sized to permit the piston rod 54 to freely extend therethrough.

The separator assembly 92 is defined by a substantially cylindrically shaped body 94 that includes a center opening permitting the axial passage of the piston rod 54, the body having an outer diameter that substantially corresponds with the interior diameter of the hydraulic cylinder 34. The separator assembly 92 is permitted to move axially within the hydraulic cylinder 34 due to thermal expansion or contraction of the hydraulic fluid 36, and due to the hydraulic fluid displaced by the piston rod 54 volume entering the hydraulic cylinder 34 during compression of the shock isolator assembly 30. The wave springs 84 load the separator assembly 92 against the hydraulic fluid 36. Seal elements are provided in the center opening of the separator body 94 as well as in relation to an exterior portion of the separator body 94 adjacent the distal end thereof to guarantee a fluid-tight seal with the piston rod 54 and the remainder of the hydraulic cylinder 34 as to the contained hydraulic fluid 36.

The rear bearing 78 is disposed in adjacent axial relation to the separator assembly 92, the rear bearing having a plurality of circumferentially disposed holes that permit the flow of hydraulic fluid 36 therethrough to the separator assembly 92. According to the present embodiment, the rear bearing 78 is secured to the hydraulic cylinder 34 by means of an annular retaining ring 87. The rear bearing 78 also has a center opening that is sized to receive the piston rod 54. An annular exterior surface 95 of the rear bearing 78 further engages an interior shoulder or ledge 97 of the hydraulic cylinder to retain the rear bearing to the hydraulic cylinder 34.

Figure 4:
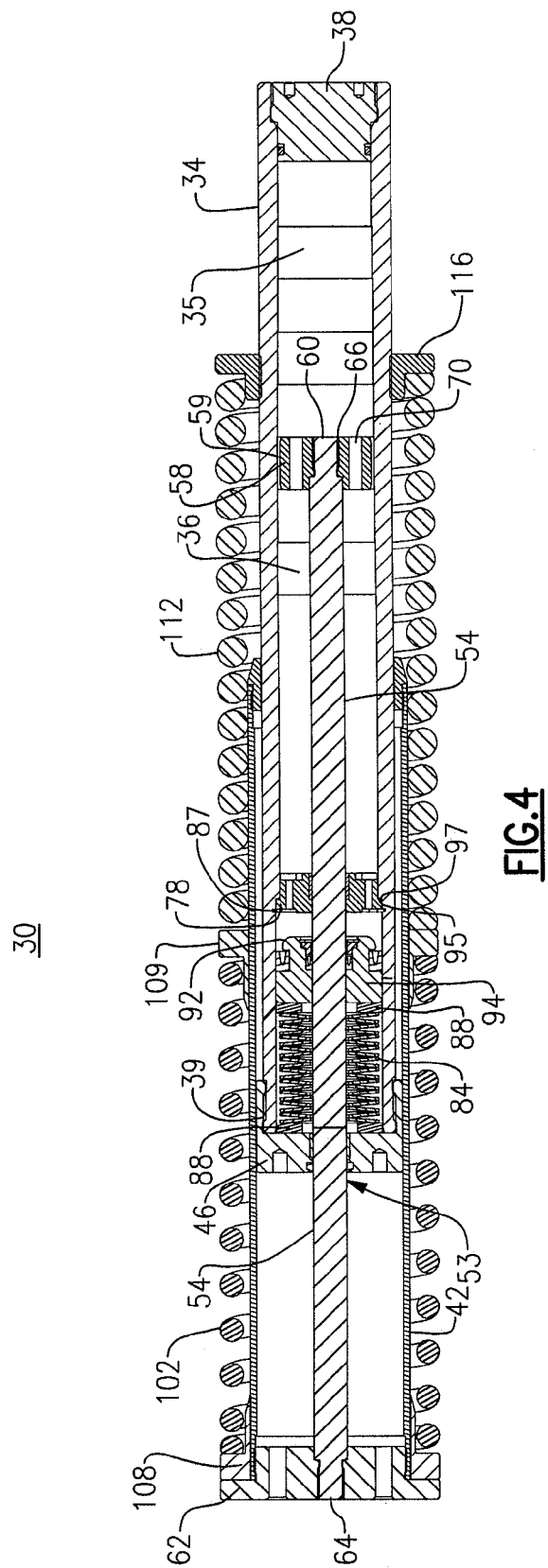
FIG. 4 is a sectioned elevational view of the shock isolator assembly of FIGS. 1-3, shown in a partially compressed or intermediate use position.
Figure 5:
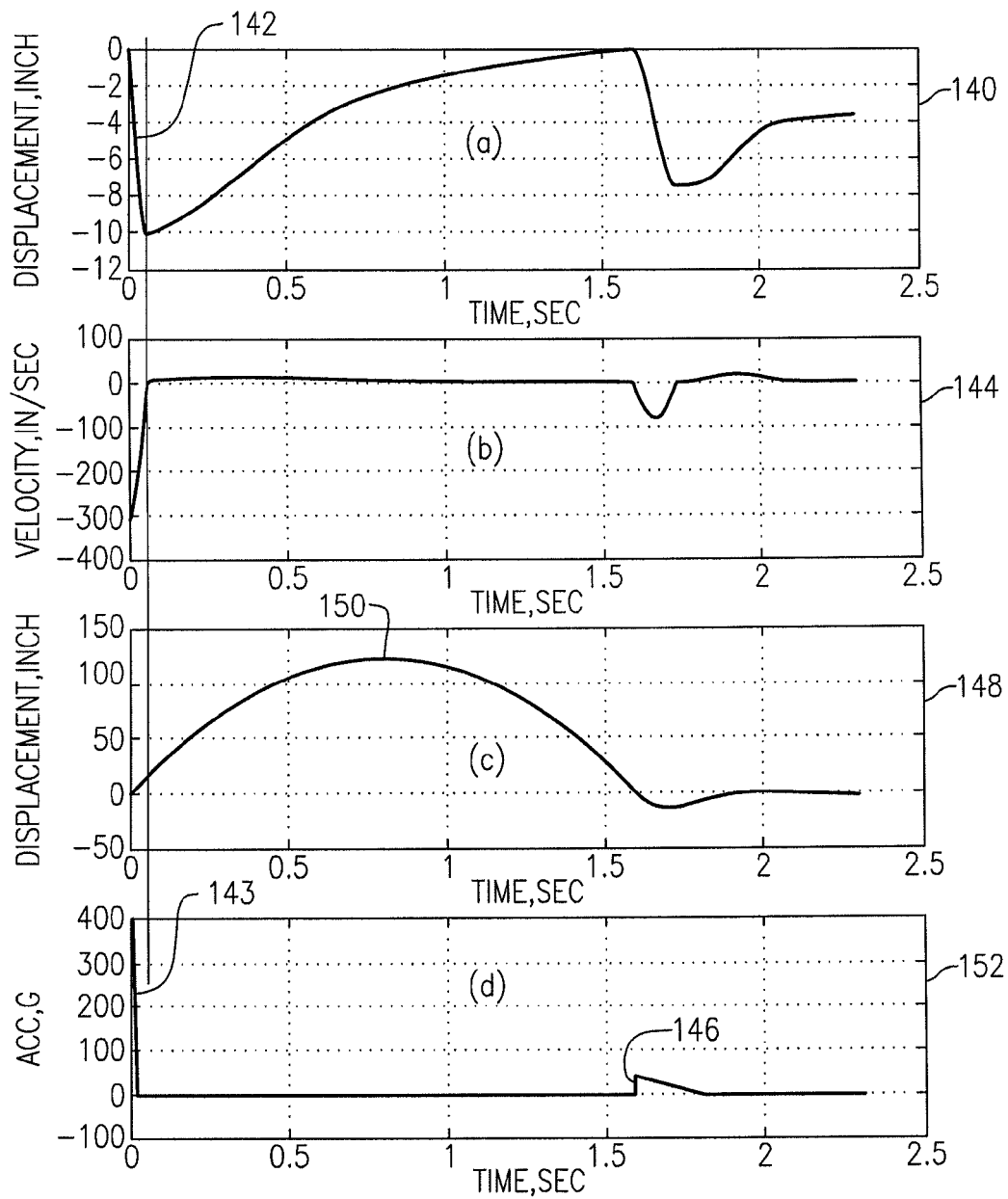
FIGS. 5(a)-(d) present graphical representations of exemplary test results for the shock isolator assembly of FIGS. 1-4.

According to this specific embodiment, a pair of coil springs are disposed in adjacent axial relation over the exterior of the shock isolator assembly 30, as shown in FIGS. 2-4. Referring more specifically to FIGS. 3 and 4, a first coil spring 102 is disposed between a pair of spring spacers 108, 109. The spring spacer 108 is annularly disposed over a shoulder of the sleeve end member 62. The spring spacer 109 is intermediately disposed over the exterior of the structural sleeve 42. Spring spacer 109 is not attached to the exterior of the structural sleeve 42 and is thereby allowed to move axially along the exterior of the structural sleeve. A second coil spring 112 is axially adjacently disposed in relation to the first coil spring 102 and more specifically between the spring spacer 109 at one end and a spring cap ring 116 at the opposite end. The spring cap ring 116 is fixedly disposed over the exterior of the hydraulic cylinder 34 wherein the latter coil spring 112 extends over axial portions of the structural sleeve 42 and the hydraulic cylinder 34, respectively.

In terms of its operation, the shock isolator assembly 30 is shown in a fully extended position in FIG. 3, which represents an unloaded condition according to this exemplary embodiment and an intermediate or partially compressed position according to FIG. 4 following the application of a transmitted shock load or acceleration pulse according to the arrow 131 (e.g., caused by a blast such as typified by a landmine, or other similar event) to the herein described assembly and vehicle floor 25, FIG. 1. As seen in the intermediate position of FIG. 4, the hydraulic cylinder 34 has axially shifted inwardly relative to the fixedly mounted structural sleeve 42 and piston assembly 53.

The axial upward movement of the hydraulic cylinder 34 in response to the applied shock load 131, as shown in FIG. 1, causes corresponding movement of the fixedly attached spring cap ring 116, thereby causing the coil springs 102, 112 to compress between the spring spacer 108 and the spring end cap 116, thereby increasing the spring force. As the hydraulic cylinder 34 moves upwardly with respect to the fixed piston assembly 53 and structural sleeve 42, the corresponding translation of the cylinder forces the hydraulic fluid 36 through the flow control elements 70 in the piston head 58 and around the annular gap 59 between the outside diameter of the piston head and the stepped bore 35 of the hydraulic cylinder 34. Because the annular gap 59 changes with the axial position of the piston head 58 in the stepped bore 35, the resisting force caused from the pressure generated in the hydraulic fluid 36 also changes. The resisting force F is defined by the relation $F=CV\alpha$, in which C is the damping constant, V is the piston velocity and $\alpha$ is the velocity exponent. Through proper selection of the hydraulic fluid 36, which according to this embodiment is a silicone fluid, the velocity exponent can range from 0.1 to 1.0 or 2.0. Due to the presence of the annular gap 59 and flow control elements of the piston head 58 in combination with the progressively stepped bore 35, the damping constant C also progressively changes, wherein the resisting force is velocity and stroke dependent. Both the spring force and the damping force are transmitted to the seat 20 and act to accelerate the seat and seat occupant 19 in a controlled manner, thus isolating the seat occupant from the high acceleration pulse. Hydraulic fluid 36 also flows through the rear bearing 78 and acts against the separator assembly 92, compressing the disc springs 84 as the piston rod volume enters into the hydraulic cylinder 34. The coil springs 102, 112 then act to return the hydraulic cylinder 34 back to the extended position. It should be noted that the exerted spring force and the preload of the springs 102, 112 are both independent of temperature. The damping force generated by the pressure created in the hydraulic fluid 36 behind the piston head 58 is utilized to control the return rate of the seat 20 and occupant 19 such that the occupant is not thrown therefrom.

Example test results of the herein described isolator assembly are graphically depicted in accordance with FIGS. 5(a)-(d). An initial upward shock or acceleration pulse, representative of a blast, causes a corresponding nearly instantaneous compression 142 of the isolator assembly 30 as shown according to graph 140, the exact extent of the isolator compression being determined based on the weight of the occupant of the seat and the precise level of the shock input wherein the displacement occurs over a very short time span (less than 0.07 seconds). Movement of the vehicle is depicted correspondingly according to graph 148 wherein a maximum displacement 150 of the vehicle is shown between 0.5 and 1.0 seconds. The maximum displacement (height) of the vehicle is a function of the blast pulse experienced. In reality, two (2) different acceleration pulses are encountered by the shock isolator assembly 30 over time, these pulses being the initial shock (blast) pulse 143 and the second being the "slam down" acceleration pulse 146, see graphs 152 that is generated after the vehicle has been lifted by the initial shock pulse and then falls back down and violently impacts the ground. Graph 144 provides an illustrative representation of the relative velocity of the shock isolator ends when exposed to the shock or acceleration pulses.

PARTS LIST FOR FIGS. 1-5(d)

10 vehicle
19 occupant
20 vehicle seat
21 back rest
23 mounting means
25 floor, vehicle
30 shock isolator assembly
34 cylinder, hydraulic
35 stepped bore
36 hydraulic fluid
37 proximal end, cylinder
38 cylinder cap
39 distal end, cylinder
42 structural sleeve
46 front bearing
50 center opening
53 piston assembly
54 piston rod
58 piston
59 annular gap
60 end
62 sleeve end member
64 opposite end
66 center opening
70 flow control elements
78 rear bearing
84 disc springs
87 retaining ring
88 flat washers
92 separator assembly
94 body, separator assembly 95 exterior surface
97 shoulder or ledge
102 coil spring, first
108 spring spacer
109 spring spacer
112 coil spring, second
116 spring cap ring
131 applied shock load
140 graph—isolator displacement vs time
142 isolator displacement
143 initial shock pulse
144 graph—relative isolator velocity vs time
146 slam down pulse
148 graph—vehicle displacement vs time
150 displacement maximum—vehicle
152 graph—input acceleration to vehicle floor vs time These and other variations and modifications will be readily apparent to those of ordinary skill in the field, as described according to the following claims.

The invention claimed is:

1. A weight compensating shock isolator assembly, comprising:
   a structural sleeve,
   a hydraulic cylinder containing hydraulic fluid, at least a portion of said hydraulic cylinder being movable within said structural sleeve,
   at least one spring with preload biased to return said hydraulic cylinder to an initial position, said at least one spring exerting a spring force that changes during movement of said hydraulic cylinder,
   a piston assembly disposed within said hydraulic cylinder and said structural sleeve, said piston assembly comprising a piston rod and a piston head, said piston head being attached to one end of said piston rod and an opposite end of said piston rod being fixedly attached to an end of said structural sleeve,
   an accumulator means disposed in one end of the hydraulic cylinder,
   a movable separator assembly disposed between the piston head and the accumulator means, said separator assembly comprising a cylindrical body having an outer diameter that substantially corresponds with an interior diameter of the hydraulic cylinder and an inner diameter through which the piston rod moves, the accumulator means being configured to provide a load against the movable separator assembly and having at least one seal element on the outer periphery, and
   an annular retaining ring disposed between the piston head and the movable separator assembly, the retaining ring having a center opening sized to accommodate the passage of the piston rod, the retaining ring being fixedly attached to the hydraulic cylinder and retaining a bearing having a plurality of circumferentially disposed holes to permit hydraulic fluid to flow therethrough toward the separator assembly when the shock isolator assembly is loaded,
   said hydraulic cylinder further including a progressively stepped interior bore formed by a single integral wall surface of the cylinder, said interior bore creating a variable annular gap around said piston head upon movement of said hydraulic cylinder in which the variable annular gap around the piston head gradually increases when the hydraulic cylinder is axially moved in a first direction and gradually decreases when the hydraulic cylinder is axially moved in an opposite direction, said piston head further including a plurality of flow control elements disposed parallel to the direction of movement of said hydraulic cylinder and in which hydraulic fluid is forced through and around the piston head with respect to the hydraulic cylinder, to create a resisting force that is stroke and velocity dependent, with a damping constant C changing with stroke of said cylinder and wherein the separator assembly is permitted to move axially within the hydraulic cylinder due to thermal expansion or contraction of contained hydraulic fluid and due to the movement of the hydraulic fluid.

2. A weight compensating shock isolator assembly as recited in claim 1, wherein the spring preload and spring force generated by said at least one spring are each temperature independent.

3. A weight compensating shock isolator assembly as recited in claim 1, further including means for compensating for fluid expansion and contraction of said hydraulic fluid and for compensating for the net rod volume of the piston rod of said piston assembly that enters the hydraulic cylinder during movement of said cylinder.

4. A weight compensating shock isolator assembly as recited in claim 3, wherein said means for compensating and said accumulator means includes a plurality of disc springs or wave washers which are disposed within an end of said hydraulic cylinder opposite said progressively stepped interior bore.

5. A weight compensating shock isolator assembly as recited in claim 1, including two axially adjacent springs disposed over said assembly, each of said springs having a different stiffness.

6. An isolator system for a vehicle blast seat, said system comprising:
   a movable cylinder adapted for vertical attachment to a frame portion of the blast seat;
   a piston assembly fixedly disposed within the movable cylinder;
   a structural sleeve supporting at least a portion of the movable cylinder and having a fixedly secured end;
   first and second biasing springs axially disposed over an exterior of said movable cylinder and the structural sleeve, the biasing springs being disposed axially in relation to one another to provide a spring preload and to further provide an increasing stiffness after the piston assembly is compressed to a predetermined axial position; and
   a damping mechanism for progressively damping the movement of the movable cylinder relative to the piston assembly in at least one axial direction thereof, said damping mechanism including:
   at least one flow control element disposed in said piston head,
   a progressively stepped interior bore formed in a single integral wall surface of the movable cylinder and in which a variable annular gap about the exterior of said piston head is created when a portion of said cylinder having said stepped interior bore is moved past said piston head wherein the variable annular gap around the piston head gradually increases when the hydraulic cylinder is axially moved in a first direction and gradually decreases when the hydraulic cylinder is axially moved in an opposite direction, and through which hydraulic fluid is forced along with said at least one flow control element, thereby creating a variable resisting force,
   an accumulator means disposed within one end of the cylinder,
   an axially movable separator assembly comprising a cylindrical body having an inner diameter through which the piston rod passes and an outer diameter that substantially corresponds with an interior diameter of the cylinder, the separator assembly being disposed between the accumulator means and the piston head, and an annular retaining ring disposed between the piston head and the movable separator assembly, the retaining ring having a center opening sized to accommodate the passage of the piston rod, the retaining ring being fixedly attached to the hydraulic cylinder and retaining a bearing having a plurality of circumferentially disposed holes to permit hydraulic fluid to flow therethrough toward the separator assembly when the shock isolator assembly is loaded.

7. An isolator system as recited in claim 6, wherein said at least one flow control element and the variable annular gap between the piston head and the stepped interior bore controls the rate of the cylinder to an initial position and said stepped interior bore creates a resisting force that is stroke and velocity dependent, and wherein said damping mechanism produces a continuously changing damping constant C.

8. An isolator system as recited in claim 7, wherein the progressively stepped bore of said movable cylinder and said at least one flow control element of said piston head provide a resisting force defined by the relation $F=CV^\alpha$ in which V is equal to piston velocity and $\alpha$ is equal to the velocity exponent, wherein $\alpha$ varies between about 0.1 and 2.0.

9. An isolator system as recited in claim 7, wherein said damping mechanism includes at least one feature for compensating for fluid expansion and contraction and for compensating for a net rod volume of said piston rod that enters the hydraulic cylinder during compression.

10. A system as recited according to claim 9, wherein said at least one compensating feature includes a series of disc springs or wave washers disposed within said cylinder in relation to the axially movable separator assembly and providing a load on said separator assembly, said series of disc springs or wave washers being further provided as said accumulator means.

11. A system as recited according to claim 6, wherein each of said biasing springs is defined by a different stiffness.

* * * * *